United States Patent [19]

Shinoda et al.

[11] Patent Number: 5,239,107

[45] Date of Patent: Aug. 24, 1993

[54] PROCESS FOR PRODUCING POLYCYANOARYL ETHER POWDER

[75] Inventors: Jitsuo Shinoda; Hirotaka Yamasaki; Toshiharu Takizawa, all of Sodegaura, Japan

[73] Assignee: Idemitsu Kosan Co., Ltd., Tokyo, Japan

[21] Appl. No.: 865,926

[22] Filed: Apr. 9, 1992

Related U.S. Application Data

[63] Continuation-in-part of Ser. No. 703,286, May 20, 1991, abandoned.

[30] Foreign Application Priority Data

May 28, 1990 [JP] Japan ................... 2-135238

[51] Int. Cl.$^5$ ................ C07C 253/30; C07C 255/51; C07C 255/52
[52] U.S. Cl. ..................... 558/420; 558/424
[58] Field of Search .......................... 558/420

[56] References Cited

U.S. PATENT DOCUMENTS

| | | | |
|---|---|---|---|
| 3,869,499 | 3/1975 | Heath et al. | 558/420 X |
| 3,873,593 | 3/1975 | Heath et al. | 558/420 |
| 3,956,320 | 5/1976 | Heath et al | 558/420 X |
| 5,117,002 | 5/1992 | Buchanan et al. | 558/420 X |

FOREIGN PATENT DOCUMENTS

| | | |
|---|---|---|
| 62-212430 | 9/1987 | Japan . |
| 62-223226 | 10/1987 | Japan . |
| 63-189435 | 8/1988 | Japan . |
| 1-135833 | 5/1989 | Japan . |
| 1-146858 | 6/1989 | Japan . |
| 727636 | 4/1980 | U.S.S.R. . |

*Primary Examiner*—Joseph Paul Brust
*Attorney, Agent, or Firm*—Frishauf, Holtz, Goodman & Woodward

[57] ABSTRACT

A process for producing a polycyanoaryl ether powder which comprises reacting a dihalogenobenzonitrile, a dihydric phenol and an alkali metal salt in the presence of a polymerization solvent, and distilling the solvent, while pulverizing the reaction mixture under agitation. The process produces a polycyanoaryl ether powder having excellent physical properties and is useful as a material for electronic appliances, electric appliances and parts of machines.

20 Claims, No Drawings

PROCESS FOR PRODUCING POLYCYANOARYL ETHER POWDER

This application is a continuation-in-part of application Ser. No. 07/703,286 filed May 20, 1991, now abandoned which is hereby incorporated by this reference.

BACKGROUND OF THE INVENTION

1. Field of the Invention

The present invention relates to a process for producing polycyanoaryl ether powder. More particularly, it is concerned with a process for the efficient production of a polycyanoaryl ether powder which is useful as a material for electronic appliances, electric appliances, and parts of various machines.

2. Description of Related Arts

Heretofore, polycyanoaryl ether produced from dichlorobenzonitrile and dihydric phenol has been known as high performance engineering plastics (see Japanese Patent Application Laid-Open No. 223226/1987). In order to increase the molecular weight of said polycyanoaryl ether, a process for adding difluorobenzonitrile was proposed (Japanese Patent Application Laid-Open No. 189435/1988).

Polycyanoaryl ether produced from dihalogenobenzonitrile and dihydric phenol according to these processes is a crystalline polymer, so it is solidified by cooling after the completion of polymerization. In order to put said polymer into practical use, however, it is required to remove the solvents, inorganic salts, oligomer and the like. Their removal requires washing with solvents having low boiling points or water. For example, Japanese patent Application Laid-Open No. 212430/1987 discloses a method of purifying the above-mentioned polymer by treating with a specified solvent. For washing with solvent, however, a grinding step to mechanically grind the solidified polymer to fine powder is required, and said grinding step has defects that a large amount of energy is required and that it is difficult to obtain a sufficient purification-effect owing to the relatively large particle size of the polymer.

Under such circumstances, the present inventor's group developed a process wherein solvents such as methanol, ethanol, methyl ethyl ketone, acetone, or water are used as so-called pulverization solvents after dihalogenobenzonitrile and dihydric phenol are polycondensed (Japanese Patent Application Laid-Open No. 135833/1989). According to said process, fine particles can be obtained easily without a step to mechanically grind the resultant polymer, but in some cases, filtration ability after the pulverization is poor. And in other cases, solidifying phenomena occurs at the pulverization, which makes the polymer treatment inconvenient, and makes the filtration and washing as the subsequent steps difficult.

Further, if water is used solely as a pulverization solvent, solidification occurs locally which makes filtration and washing as the subsequent steps very difficult.

Polymers particulated by adding a pulverization solvent and ground by cooling to setting have a small bulk density and have a large volume of cake in washing, so the operation ability in the washing step and the granulating step is problematic. In addition, the liquid content in washing is so high that it takes a long time to remove the impurities and purify the product.

Further, methods of using N-methylpyrrolidone as a pulverization solvent has been studied, but, the powder obtained by pulverization step with a mixed solvent of N-methylpyrrolidone and water have difficulties in handling because of a large volume of cake in the washing step, and is low in bulk density. In the pulverization step with the use of the above-mentioned pulverization solvent, inconveniently a large amount of solvent must be used so as to prevent caking or adhering. Because of a small bulk density, flow rate becomes unstable when molding.

On the other hand, if solvent is distilled away without depositing the polymer, during or after the polymerization, flooding will occur, and caking and adhering occur. In this case, there are defects that the handling and washability become worse, and that bulk density is low.

In this situation, the present inventors repeated intensive studies to develop a process to dissolve the above-mentioned technical defects, and to obtain a polymer having a small liquid content and a good washability, with a small volume of cake in the washing step of the polymer obtained after the polycondensation of dihalogenobenzonitrile and dihydric phenol, and to produce stably and easily a polycyanoaryl ether powder which is high bulk density and is excellent in the moldability.

As the result, it was found that the above object can be attained by distilling away the solvent with a particular step after the polycondensation reaction. The present invention was accomplished on the basis of such knowledge.

SUMMARY OF THE INVENTION

The present invention provides a process for producing polycyanoaryl ether powder comprising reacting dihalogenobenzonitrile, dihydric phenol and alkali metal salt in the presence of a polymerization solvent, and distilling the solvent away from the reaction mixture while pulverizing it under agitation at a maximum power of 3–40 KW per $m^3$ of the reaction mixture and a clearance of not more than 30 mm between a reactor wall and a blade or between reactor blades.

Further, the present invention provides a process for producing polycyanoaryl ether powder comprising reacting dihalogenobenzonitrile, dihydric phenol and alkali metal salt in the presence of a polymerization solvent, adding a pulverization solvent to the reaction mixture to pulverize the resulting polymer, or adding a polymerization solvent to the reaction mixture with the subsequent cooling to pulverize the resultant polymer, and subsequently, distilling the solvent away.

Furthermore, the present invention provides a process for producing polycyanoaryl ether powder, which comprises reacting dihalogenobenzonitrile, dihydric phenol and alkali metal salt in the presence of polymerization solvent, cooling the reaction mixture to deposit the polymer, and then, pulverizing the polymer without or with a pulverization solvent or polymerization solvent, and subsequently distilling the solvent away.

DESCRIPTION OF PREFERRED EMBODIMENTS

The dihalogenobenzonitrile to be used in the present invention includes 2,6-dichlorobenzonitrile, 2,6-difluorobenzonitrile, 2,4-dichlorobenzonitrile, 2,4-difluorobenzonitrile, 2-chloro-6-fluorobenzonitrile, 2-fluro-6-chlorobenzonitrile, and among them, 2,6-dichlorobenzonitrile, and 2,6-difluorobenzonitrile are particularly preferred.

The dihydric phenol of the present invention is at least one substance selected from dihydroxybenzenes such as 1,2-dihydroxybenzene, 1,3-dihydroxybenzene, 1,4-dihydroxybenzene, 2-methyl-1,4-dihydroxybenzene, 2,6-dimethyl-1,4-dihydroxybenzene, and 2-methoxy-1,4-dihydroxybenzene; dihydroxybiphenyls such as 4,4'-dihydroxybiphenyl, 3,5'-dihydroxybiphenyl, 3,5-dihydroxybiphenyl, 3-methyl-4,4'-dihydroxybiphenyl, and 2,2'-dimethyl-4,4'-dihydroxyphenyl; dihydroxynaphthalenes such as 1,2-dihydroxynaphthalene, 1,3-dihydroxynaphthalene, 1,4-dihydroxynaphthalene, 1,5-dihydroxynaphthalene, 1,6-dihydroxynaphthalene, 1,7-dihydroxynaphthalene, 1,8-dihydroxynaphthalene, 2,3-dihydroxynaphthalene, 2,6-dihydroxynaphthalene, 2,7-dihydroxynaphthalene, and 4,8-dimethyl-2,6-dihydroxynaphthalene; and dihydroxydiphenylethers such as 4,4'-dihydroxydiphenylether.

The particularly preferred dihydroxyaryl compounds are 1,3- and 1,4-dihydroxybenzene (resorcinol, hydroquinone).

Further, the alkali metal salt of the present invention is at least one salt selected from sodium hydrocarbonate, sodium carbonate, potassium carbonate, and potassium hydrocarbonate. Among them which sodium hydrocarbonate, sodium carbonate, and potassium carbonate are particularly preferred.

In the process of the present invention, dihalogenobenzonitrile, dihydric phenol and alkali metal salt as mentioned above are mixed, wherein usually dihalogenobenzonitrile and dihydric phenol are mixed in a molar ratio of 0.95–1.20 to 1, preferably in an almost equal molar ratio, and alkali metal salt to dihalogenobenzonitrile as the starting material is used in a molar ratio of 1.0–3.0 to 1, and specifically sodium hydrocarbonate is in a molar ratio of 2.05–2.40 to 1 and sodium carbonate and potassium carbonate are used in a molar ratio of 1.03–1.30 to 1.

The solvent to be used in the polymerization (polycondensation), that is, the polymerization solvent, of the present invention is at least one substance selected from N-alkylcarboxylic acid amides such as N-methylformamide, and ethylacetoamide; N,N-dialkylcarboxylic acid amides such as N,N-dimethylformamide, N,N-diethylformamide, N,N-dimethyl acetoamide; N-alkyllactams such as N-methylpyrrolidone, and N-ethylpyrrolidone; N-alkylcarboxyimide such as N-methylpyrrolydinone; sulfoxides such as dimethylsulfoxide, and diethylsulfoxide; sulfones such as dimethylsulfone, diethylsulfone, and diphenylsulfone; cyclosulfones such as sulfolane; nitriles such as acetonitrile, propionic nitrile, butylonitrile, succinonitrile, and benzonitrile; and benzophenone.

Among these solvents aprotic strong polar organic solvents such as dimethylsulfoxide, dimethylsulfone, diethylsulfone, diphenylsulfone, sulfolane, N,N-dimethylformamide, N-methylpyrrolidone, N-methylpyrrolidone, and mixtures thereof are preferable, and among them, particularly preferable ones are sulfolane, N-methylpyrrolidone, and N-methyl-2-pyrrolidone (NMP).

In the polymerization, it is preferred that the above-mentioned dihalogenobenzonitrile and dihydric phenol as the starting material are dissolved in the above-mentioned solvent. For instance, when resorcinol is used as dihydric phenol and N-methylpyrrolidone is used as polymerization solution, preferred concentration of the solution is 0.5 to 2.5 (mol of resorcinol/liter of N-methylpyrrolidone), more preferably 0.7 to 1.5 (mol of resorcinol/liter of N-methylpyrrolidone). Said polycondensation reaction is usually carried out in a temperature range of 140° to 350° C., preferably 160° to 250° C. for 1 to 10 hours, preferably 2 to 5 hours. Further, said reaction may be carried out under a pressure of atmospheric pressure to 2300 mmHg. The reaction will be more effective in an atmosphere of inert gas such as argon gas, and nitrogen gas.

In the above-mentioned polymerization condensation reaction, a molecular weight modifier can be added, if required. As the molecular weight modifiers to be used, monohalogenobenzonitrile, dihalogenobenzonitrile and the like are mentioned. The amount to be used can be determined properly depending on the molecular weight of the desired polymer.

Further, specific conditions of the above-mentioned conditions are described in Japanese Patent Application Laid-Open Nos. 206433/1984, 162523/1986, 192732/1986, 223226/1987, 189435/1988, and 270733/1988.

In the process of the present invention, after the completion of the above-mentioned polycondensation reaction, any one of the five steps below is carried out:

(i) To distill the solvent away while pulverizing the reaction mixture under agitation.

(ii) To distill the solvent away while pulverizing the reaction mixture under agitation and cooling it.

(iii) To add a pulverization solvent of the resultant polymer to the reaction mixture with subsequent mixing to pulverize the resultant polymer, or add a polymerization solvent to the reaction mixture followed by mixing with subsequent cooling to pulverize the resultant polymer, and subsequently distill the solvent away.

(iv) To dilute the reaction mixture by adding a polymerization solvent with subsequent mixing in such an amount that the resultant polymer may not be pulverized, and subsequently, to pulverize the resultant polymer by adding a pulverization solvent of the resultant polymer with subsequent mixing, and then distill the solvent away, and (v) To cool the reaction mixture, to deposit the resultant polymer and then pulverize the polymer without or with a pulverization solvent or polymerization solvent, and then distill the solvent away.

Pulverization means that solid polymer particles (i.e., powder) precipitate from the polymerization solution in the presence of the pulverization (also referred to as the powder forming) solvent.

By removing the solvent in this manner, a polymer having an excellent washability with a small liquid content can be obtained.

As a pulverization apparatus (an apparatus to pulverize the reaction mixture (slurry) under agitation) in (i) above, a tank-type reactor provided with agitating blades in the tank, such as an ordinary anchor blade, a seepback blade, a paddle, a leaf blade, and a sigma-type blade, a mono- or multi-axial kneader or an extruder, an oscillating apparatus, and a paddle drier can be used. Said pulverization apparatus may be incorporated in the reactor, for example, formed by providing agitating blades to the reactor, or a pulverization tank or a pulverization appliance may be provided separately from the reactor. The pulverization stage (and the solvent distillation stage) in the steps (i)–(v) is carried out under the conditions in which the maximum agitating power is 3 to 40 KW per m$^3$ of the reaction mixture and the clearance between the reactor wall and the blade or between the reactor blades is not more than 30 mm. The temperature of the slurry ranges from the room temperature to the boiling point (according to the atmospheric pressure), under the ordinary pressure with the use of various inert gases, azeotropic solvent as a distillation medium, or self pressure, or under reduced pressure. The period of distillation of the solvent is adjusted so that the solvent of 0.007 to 0.97 times, preferably 0.3 to 0.7 as much as the solvent to be used for the reaction may be distilled away in a minute.

As described in (ii) above, the volume of the cake can be reduced by cooling the reaction mixture while pulverizing under agitation, and then by distilling away the solvent. The temperature for the cooling is preferably lower than the polymerization temperature, for instance, a temperature ranging from the room temperature to about 195° C., and can be effected successively to the whole or a part of the period of distillation of the solvent or at proper intervals, but usually cooling for 0 (corresponding to (i) above) to 480 minutes will be enough.

In (iii) above, a solvent (pulverization solvent) which has a compatibility with a polymerization solvent but does not dissolve the resultant polymer is added. When such a solvent is added thereto, the resultant polymer is not dissolved but is fractionated into particles. As shown in (iv) above, after a diluent is added to the polymerization solvent with subsequent cooling, a pulverization solvent can be added. As the diluent, a neutral polar solvent similar to the above-described polymerization solvent can be used. The amount of the diluent to be added is 1 cc or more per 1 g of the resultant polymer, or within three times (ratio by volume) as large as that of the polymerization solvent. The diluent may be added all at once or by degrees within 30 minutes. It is preferred that the temperature of the reaction system at the dilution ranges from 150° C. to the polymerization temperature, and the temperature of the system after dilution ranges from 50° to 190° C.

On the other hand, examples of the pulverization solvent are methanol, ethanol, propanol, isopropanol, acetone, methyl ethyl ketone, water, and mixtures thereof, and mixtures of a polymerization solvent. Among them, those with a low boiling point is preferable so as not to leave the solvent in the polymer. The amount of pulverization solvent to be added depends on various conditions, and cannot be determined unconditionally, but usually is at least 0.2 times, preferably 0.5 to 5.0 times as much as the polymer solution. If the amount to be added is too small, only a part of the polymer may be pulverized, and other parts may form into a cake state, which leads to a low yield.

In adding the pulverization solvent, the temperature of the polymer solution can be set in a proper range, but, generally is in a range lower than the boiling point of the mixture of polymer solution and pulverization solvent, preferably in a range of 100° to 180° C. If it is too low, the polymer becomes a cake before the addition of said solvent, and if it is too high, the amount of evaporated pulverization solvent is undesirably high.

The above-mentioned pulverization solvent can be added all at once, but usually is added over 1 to 60 minutes, preferably 3 to 20 minutes. If the solvent is added too rapidly, the polymer might partly aggregate without being pulverized, while if addition takes too much time, the productivity is lowered.

As the above-described pulverization solvent, a solvent mixed with the polymerization solvent, for example, a mixed solvent of the above-mentioned N-methylpyrrolidone and water can be used. The ratio of N-methylpyrrolidone and water in the above mixed solvent is not particularly limited, but usually, is N-methylpyrrolidone/water=95/5 to 30/70 (ratio by volume), preferably 90/10 to 50/50 (ratio by volume). Usually, the amount of the pulverization solvent comprising N-methylpyrrolidone and water is 0.5 to 5 times (ratio by volume) of that of the above-mentioned polymerization solvent.

After the resultant polymer is pulverized in this way, the solvent is distilled away under the same conditions as above.

As described in (v) above, the reaction mixture is cooled as it is after the completion of the reaction to deposit the resultant polymer, and the deposited polymer may be pulverized.

As the conditions for cooling, the reaction mixture is preferably cooled in a range of from the room temperature to 130° C. over 1 to 480 minutes, and the pulverization under agitation of the present invention at cooling brings a deposition under a more preferable condition. Pulverization can be carried out by usual mechanical grinding means, at room temperature to the boiling point of the solvent. When polymerization solvent or pulverization solvent is added in the amount of 1 cc or more per 1 g of resultant polymer at said pulverization, the pulverization of the polymer can be carried out easily. The removal of the solvent after the pulverization can be effected as above.

When the polymer particles obtained are filtrated, and subjected to necessary post-treatment such as washing, and drying, the desired polymer powder can be obtained.

As the solvent for washing, a polymerization solvent or a pulverization solvent can be used. The preferable amount of the washing solvent to be used is usually 0 (no washing) to 10 times that of the polymerization solvent, and when the mixed solvent with the polymerization solvent is used, the ratio is as polymerization solvent/pulverization solvent=100/0 to 0/100. The appropriate temperature of washing solution ranges from room temperature to the boiling point, the appropriate washing period ranges from 1 to 60 minutes, and the washing time is 0 (no washing) to 10 times. By the washing, the remaining oligomer and others in the polymer cake are removed effectively.

The remaining alkali can be removed by neutralizing with inorganic acids such as hydrochloric acid and organic acid such as oxalic acid, and further the remaining salt can be removed by washing with water at room temperature to 150° C. Then by a proper drying treatment, a polycyanoarylether powder favorable in molecular weight, powder properties, thermal properties, amount of impurities can be obtained. As described above, according to the present invention, a polymer cake having a small cake volume in washing, and being excellent in washing ability with a liquid content can be obtained, and further, a polycyanoarylether powder favorable in molecular weight, powder properties, thermal properties, and amount of impurities can be obtained easily. Consequently, subsequent purifying process can be carried out effectively, and a polycyanoarylether powder of high quality having a very small amount of impurities can be obtained easily.

Therefore, the polycyanoarylether powder obtained according to the present invention can advantageously be utilized as a material for electronic appliances, electric appliances, and parts of machines.

The present invention will be described in detail by the following examples and comparative examples.

EXAMPLE 1

16.5 g of resorcinol, 25.7 g of 2,6-dichlorobenzonitrile, 17.5 g of sodium carbonate, and 150 ml of N-methyl-2-pyrrolidone (NMP) were placed in a 1-liter separable flask equipped with a rectifier, an agitater a Dean-stark trap, and an inert gas blow inlet. The mixture was then heated to 195° C. while blowing argon gas, and one hour later, toluene was added thereto, refluxed, dehydrated, then reacted at 200° C. for 75 minutes Subsequently, a solution of 0.3 g of 2,6-difluorobenzonitrile/5 ml of NMP was added and the mixture was reacted for 75 minutes to increase the molecular weight, and then a solution of 1.0 g of 2,6-difluorobenzonitrile/5 ml of NMP was added, reacted for 30 minutes to effect a terminal treatment.

As the agitater therein, an anchor blade was used, with a clearance of 13 mm between the blade and the wall of the reactor.

After the reaction was completed, the solution was mixed for 10 minutes at 200 rpm. The temperature of the polymer solution was 191° C. wherein a part of the content was deposited. Immediately in this condition, NMP was vacuum-distilled away, while a shearing force was applied at 500 rpm. The rate of distillation was 116 ml per 3 minutes.

By this operation, powdery particles were obtained. Then 150 ml of NMP was added thereto, and the mixture was stirred and washed at 110° C. for 10 minutes, and the oligomer was filtrated off. Then 400 ml of water was added thereto, and the mixture was stirred and washed for 30 minutes at 60° to 80° C., filtrated to remove the remaining salt component. The residue was rinsed with water five times, and at the third rinsing, 2.5 g of oxalic dihydrate was added thereto.

After drying under reduced pressure for 8 hours at 130° C., a polymer was obtained.

At each washing step, the liquid content as well as the volume of the cake was measured. As the result, the volume of the cake was 4.3 cc/g (weight as dry polymer). The liquid content after washing with NMP was 50% by weight and that after washing with water was 56% by weight. The liquid content was measured at each washing step, by calculating the amount of evaporated solvent of the sampled polymer cake when the polymer cake attained equilibrium weight after dried under reduced pressure at 140° C.

The maximum agitating power was 26 KW per $m^3$ of the reaction mixture, calculated from the torque after distillating the solvent away and obtaining the dried powder particles.

The amount of the resultant polymer was 30.01 g (yeild: 95.7% by weight), and reduced viscosity was 1.34 dl/g (60° C., in p-chloropehnol solvent, concentration: 0.2 g/dl). The remaining Na in the polymer was 5 ppm, residual oligomer in the polymer was 1.3% by weight, residual NMP in the polymer was 0.01% by weight, volume density of the polymer was 0.33 g/cc, and the average particle size was 150 micron. The average particle size was measured by sieving the dried powder and weighing it.

The methods used for measuring the residual components are as follows:
  Na, K: Atomic absorption analysis
  Oligomer: High performance liquid chromatography (dimethylformamide extraction)
  NMP: Gas chromatography (chloroform extraction)
  Liquid content (% by weight): (sample weight before drying−sample weight after drying)/100×100,
  wherein the sample weight after drying is a value which attained an equilibrium weight after drying at 130° C. under reduced pressure.

EXAMPLES 2 TO 14

The procedure of Example 1 was repeated substituting the reaction conditions for those shown in Table 1 to obtain a polymer powder, and for each example, liquid content, residual Na, residual oligomer, residual NMP, reduced viscosity, volume of the cake, volume density, and average particle size were measured in the same manner as in Example 1. The results are shown in Table 1, including the clearance between the reactor wall and the blade and the maximum agitating power in the solvent distillation.

In Example 4, the reaction mixture was slowly cooled while stirred slowly after polymerization condensation, and temperature was lowered (from 200° C. to 30° C. in 5 hours) to obtain a slurry. The bath temperature was set at 50° C., and NMP was vacuum distilled away while slowly mixing.

In Example 7, the terminal treatment was carried out immediately, without adding 2,6-difluorobenzonitrile to increase molecular weight.

In Example 8, the terminal treatment was carried out after adding 2,6-difluorobenzonitrile to increase molecular weight and reacting for 165 minutes.

In Examples 9 to 12, the shape of the agitating blade was altered.

In Example 13, the amount of the starting material used was increased to 1.33 times, the mixture after the reaction was transferred to a kneader preheated to about 200° C., and the solvent was distilled away while mixing.

In Example 14, the starting material used was doubled, the mixture was transferred to a kneader preheated to about 200° C., slowly cooled to about room temperature (for about 4 hours), to deposit particles, and then the kneader was heated again to about 200° C. to distill away the solvent.

The kneader used in Examples 13 and 14 was a biaxial type with a mixing part of approximately 120 mm in total length, and with the distance between the blades being about 5 to 20 mm wherein the distance indicates the minimum clearance between reactor blades.

EXAMPLE 15

A polymerization reaction was carried out using the same apparatus and procedure as in Example 1. Then the bath temperature was set at 225° C., and the contents were mixed while applying a shearing force with blades rotating at 500 rpm. Argon gas was blown at the rate of 300 ml/min into the polymer solution, to distill away NMP.

The temperature of the contents at this time was 204° to 198° C. The distillation rate of NMP was 95 ml per 16 minutes. By this operation, powdery particles were obtained.

Next, the powder was subjected to NMP washing, neutralizing and washing in the same manner as in Example 1, and then dried. The liquid content, residual Na, residual oligomer, residual NMP, reduced viscosity, cake volume, volume density and average particle size of polymer cake were measured in the same manner as in Example 1. The results are shown in Table 1, including the clearance between the reactor wall and the blade and the maximum agitating power in the solvent distillation.

TABLE 1

| Example No. | Amount of starting Material (mol) | Amount of Polymerization Solvent (ml) | Agitating Blade | Clearance (mm) | Temperature at Start of Distillation (°C.) | Distillation Ratio (ml/min) | Liquid Content (wt %) | Maximum Agitating Power in Pulverization stage (KW/m$^3$) |
| --- | --- | --- | --- | --- | --- | --- | --- | --- |
| Example 2 | 0.15 | 150 | Anchor | 13 | 185 | 110/3.5 | 52 to 59 | 24 |
| Example 3 | 0.15 | 150 | Anchor | 13 | 160 | 113/4.5 | 57 to 64 | 24 |
| Example 4 | 0.15 | 150 | Anchor | 13 | 50 | 110/8 hr | 60 to 70 | 10 |
| Example 5 | 0.15 | 150 | Anchor | 13 | 190 | 85/2 | 62 to 67 | 25 |
| Example 6 | 0.15 | 150 | Anchor | 13 | 190 | 137/7 | 52 to 58 | 23 |
| Example 7 | 0.15 | 150 | Anchor | 13 | 170 | 107/7 | 50 to 60 | 21 |
| Example 8 | 0.15 | 150 | Anchor | 13 | 175 | 116/3.5 | 52 to 60 | 25 |
| Example 9 | 0.15 | 150 | Pfaudler | 13 | 185 | 108/3 | 54 to 62 | 17 |
| Example 10 | 0.15 | 150 | *1 | 4 | 174 | 110/6 | 55 to 64 | 17 |
| Example 11 | 0.15 | 150 | *2 | 17.6 | 170 | 110/5 | 51 to 58 | 19 |
| Example 12 | 0.15 | 150 | *3 | 13 | 170 | 108/5 | 57 to 62 | 16 |
| Example 13 | 0.20 | 200 | Kneader | 1.3*4 | 180 | 160/80 | 52 to 61 | 15 |
| Example 14 | 0.30 | 300 | Kneader | 1.3*4 | 180 | 228/70 | 52 to 60 | 15 |
| Example 15 | 0.15 | 150 | Anchor | 13 | 200 | 95/16 | 60 to 63 | 24 |
| Example 16 | 0.15 | 150 | Anchor | 13 | 170 | 110/4 | 48 to 51 | 23 |

| Example No. | Residual Na (ppm) | Residual Oligomer (wt %) | Residual NMP (wt %) | Reduced viscosity ($\eta$sp/c) | Cake volume (ml/g) | Bulk Density (g/cc) | Average Particle Size (μm) |
| --- | --- | --- | --- | --- | --- | --- | --- |
| Example 2 | 10 | 1.3 | 0.02 | 1.02 | 4.3 | 0.33 | 168 |
| Example 3 | 5 | 1.6 | 0.02 | 1.22 | 4.3 | 0.31 | 153 |
| Example 4 | 11 | 1.6 | 0.03 | 1.20 | 4.4 | 0.30 | 162 |
| Example 5 | 10 | 1.5 | 0.05 | 1.15 | 5.3 | 0.26 | 162 |
| Example 6 | 7 | 1.4 | 0.02 | 1.16 | 4.3 | 0.33 | 162 |
| Example 7 | 10 | 1.0 | 0.02 | 0.57 | 4.2 | 0.34 | 156 |
| Example 8 | 7 | 1.4 | 0.03 | 1.50 | 4.3 | 0.33 | 160 |
| Example 9 | 12 | 1.4 | 0.03 | 1.30 | 4.2 | 0.35 | 169 |
| Example 10 | 12 | 1.5 | 0.05 | 1.30 | 4.5 | 0.30 | 152 |
| Example 11 | 7 | 1.2 | 0.01 | 1.20 | 4.2 | 0.34 | 160 |
| Example 12 | 8 | 1.5 | 0.02 | 1.16 | 4.3 | 0.32 | 152 |
| Example 13 | 11 | 1.2 | 0.02 | 1.23 | 4.3 | 0.34 | 155 |
| Example 14 | 10 | 1.2 | 0.01 | 1.21 | 4.3 | 0.35 | 152 |
| Example 15 | 13 | 1.5 | 0.03 | 1.25 | 4.6 | 0.28 | 165 |
| Example 16 | 10*4 | — | 0.01 | 1.42 | 4.0 | 0.40 | 158 |

*1Double Helica Ribbon
*2Multi-stage inclined paddle
*3Semicircular paddle
*4Minimum clearance between blades
*4Residual K (ppm)

EXAMPLE 16

With the use of the same apparatus as in Example 1, polycondensation was performed using dihydric phenol and 1,4-dihydroxybenzene(hydroquinone). 16.5 g of hydroquinone, 26.3 g of 2,6-dichlorobenzonitrile, 24.9 g of potassium carbonate and 150 ml of NMP were placed in the reactor, heated to 150° C. while blowing argon gas, and maintained at 150° C. for 2 hours. Then, the mixture was heated to 195° C., refluxed with toluene for one hour to be dehydrated. Then, the mixture was reacted for 2 hours at 200° C.

After the reaction was completed, the reaction product was cooled to an inner temperature of 170° C. while mixed at 200 rpm. At this time, a part of the reaction mixture was deposited. In this condition, NMP was distilled away immediately, while applying a shearing force at 500 rpm. The rate of NMP distillation was 110 ml per 4 minutes. By this operation, powdery particles were obtained.

Subsequently, 400 ml of water was added thereto, and a salt component was removed and dried in the same manner as in Example 1. The ratio of liquid content, residual K, residual NMP, reduced viscosity, cake volume, volume density, and average particle size of the polymer cake were measured in the same manner as in Example 1. The results are shown in Table 1, including the clearance between the reactor wall and the blade and the maximum agitating power in the solvent distillation.

EXAMPLE 17

The polymerization procedure of Example 1 was repeated except that a double amount of the starting material and the solvent were used, and 100 ml of NMP was added thereto to dilute the reaction solution. The temperature of the content in this case was 173° C. Subsequently, 300 ml of mixed solvent of NMP and water (in the ratio of 8:2 by volume) was added to obtain a slurry. The temperature of the content was 112° C.

The slurry thus obtained was kept at 110° to 130° C., and water and NMP were vacuum-distilled away over 60 minutes. The amount of the solvent distilled away then wa 620 ml. Then, the residue was washed with NMP (300 ml, 110° C., 10 minutes) and filtrated in the same manner as in Example 1, and thus oligomer was washed away.

Next, the reaction product was neutralized and washed with water (800 ml, 60° to 80° C., 30 minutes) and the residual salt was removed. At this washing step, washing and filtration were repeated five times. At the third washing, 5 g of oxalic dihydrate was added thereto. The mixture was dried at 130° C. for 8 hours to obtain a polymer.

In the same manner as in Example 1, liquid content, residual Na, residual oligomer, residual NMP, reduced viscosity, cake volume, volume density, and average particle size of the resultant polymer cake were determined. The results are shown in Table 2, including the clearance between the reactor wall and the blade and the maximum agitating power in the solvent distillation.

EXAMPLE 18

The polymerization as described in Example 1 was conducted, and then the resultant polymer was transferred to a bat, and cooled to room temperature and solidified. The temperature at one minute after the start of cooling was 100° C., and the temperature after 15 minutes was 30° C. Next, after the polymer was finely ground with a spatula, it was heated to 130° C., and NMP was distilled away over 11 minutes. The amount of the solvent distilled away then was 112 ml.

Subsequently, the residue was subjected to NMP washing, neutralization and washing. The liquid content, residual Na, residual oligomer, residual NMP, reduced viscosity, cake volume, volume density, and average particle size of the resultant polymer cake were measured. The results are shown in Table 2, including the clearance between the reactor wall and the blade and the maximum agitating power in the solvent distillation.

EXAMPLE 19

A polymerization procedure was conducted in the same manner as in Example 1, and the reaction product was transferred to a bat, and cooled to room temperature and solidified. The temperature at one minute after the start of cooling was 120° C., and the temperature after 18 minutes was 30° C. Then, the polymer was ground with a blender using 300 ml of a mixed solvent of NMP and water (in a ratio of 8:2 by volume), and then the slurry was heated to 130° C., and NMP and water was distilled away over 65 minutes. The amount of the solvent distilled away then was 411 ml. Subsequently, the residue was subjected to NMP washing, neutralizing and washing in the same manner as in Example 1. The resultant polymer cake was measured for liquid content residual Na, residual oligomer, residual NMP, reduced viscosity, cake volume, volume density, and average particle size, in the same manner as in Example 1. The results are shown in Table 2, including the clearance between the reactor wall and the blade and the maximum agitating power in the solvent distillation.

COMPARATIVE EXAMPLE 1

A polymerization condensation was conducted in the same manner as in Example 1, and immediately on completion of the reaction, NMP was vacuum-distilled away without applying any shearing force. After several seconds in that condition, the content was bumped, wherein it was solidified on and adhered to the reactor or blades. The distillation ratio at that point was 66 ml per three minutes. From that condition, grinding and peeling was effected by a spatula and the like, but the polymers formed as a cake or film, and powder-like particles were not obtained.

COMPARATIVE EXAMPLE 2

A polymerization condensation was conducted in the same manner as in Example 1, and the content was transferred to the kneader used in Examples 13 and 14 to be mixed at room temperature, cooled to room temperature while mixing the content, wherein a polymer cake was obtained. Then, the content was taken out, 400 ml of a mixed solvent of NMP and water (in a ratio of 8:2 by volume) was added thereto, and mixed and washed at 110° C. for 10 minutes, and filtrated to remove the residual oligomer.

Subsequently, the residue was washed with 400 ml of water at 60° to 80° C. for 30 minutes, and filtrated to remove the residual salt. This washing step was repeated five times. At the third washing, 2.5 g of oxalic dihydrate was added thereto. Thereafter, the mixture was vacuum-dried at 130° C. for 8 hours to obtain powder.

The resultant polymer cake wa measured for liquid content, residual Na, residual oligomer, residual NMP, reduced viscosity, cake volume, volume density, and average particle size. The results are shown in Table 2, including the clearance between the reactor wall and the blade and the maximum agitating power in the solvent distillation.

COMPARATIVE EXAMPLE 3

A polymerization condensation was conducted in the same manner as in Example 1, and 50 ml of NMP was added thereto to dilute the reaction solution. The temperature of the content at that time was 175° C. Subsequently, 150 ml of a mixed solvent of NMP and water (in a ratio of 8:2 by volume) was added as the pulverization solvent, to obtain a slurry. The temperature of the slurry was 125° C.

The resultant slurry was filtered, and the cake was washed with 400 ml of a mixed solvent of NMP/water at 110° C. for 10 minutes and filtrated to remove the residual oligomer. Then, the residue was washed with 400 ml of water at 60° to 80° C. for 30 minutes, and filtrated to remove the residual salt. This washing step was repeated five times. At the third washing, 2.5 g of oxalic dihydrate was added thereto.

Then, after vacuum drying at 130° C. for 8 hours, powder was obtained. The resulting cake was measured for liquid content, residual Na, residual oligomer, residual NMP, reduced viscosity, cake volume, volume density, and average particle size. The results are shown in Table 2, including the clearance between the reactor wall and the blade and the maximum agitating power in the solvent distillation.

COMPARATIVE EXAMPLE 4

A polycondensation was conducted in the same manner as in Example 1, and the reactor was air-cooled to room temperature to solidify the content. Then, the content was taken out, and 400 ml of water was added thereto, ground with a Waring Blender and filtered to obtain a polymer cake. Subsequently, 150 ml of NMP was added thereto, washed at 110° C. for 10 minutes, and filtrated to remove the residual oligomer. The residue was washed with 400 ml of water at 60° to 80° C. for 30 minutes, and filtrated to remove the residual salt. This washing step was repeated five times. At the third washing, 2.5 g of oxalic dihydrate was added thereto.

Thereafter, the reaction product was vacuum-dried at 130° C. for 8 hours to obtain a powder. The resultant polymer cake was measured for ratio of liquid content, residual Na, residual oligomer, residual NMP, reduced viscosity, cake volume, volume density, and average particle diameter. The results are shown in Table 2.

COMPARATIVE EXAMPLE b 5

A polycondensation was conducted in the same manner as in Example 16, and after the completion of reaction, the content was cooled to 170° C., and then 500 ml of a mixed solvent (in a ratio of 8:2 by volume) of NMP, and water was added thereto as a pulverization solvent to obtain a polymer slurry. The temperature of the slurry was 90° C. The resultant slurry was washed and dried in the same manner as in Example 16 to obtain a powder.

The polymer cake was measured for ratio of liquid content, residual K, residual NMP, reduced viscosity, cake volume, volume density, and average particle size in the same manner as in Example 1. The results are shown in Table 2.

COMPARATIVE EXAMPLE 6

The polymerization and the distillation of the solvent were carried out by means of the same apparatus as that in Example 1 except for using an anchor blade with a clearance of 35 mm between the reactor wall and the blade. After distilling the solvent away, only a portion of cake on the middle part of the blade was pulverized and the solidification occurred in the reactor.

TABLE 2

| Example No. | Liquid Content (wt %) | Residual Na (ppm) | Residual Oligomer (wt %) | Residual NMP (wt %) | Reduced Viscosity ($\eta$sp/c) | Cake Volume (ml/g) | Bulk Density (g/cc) | Average Particle Size ($\mu$m) | Clearance (mm) | Maximum Agitating Power in Pulverization stage (KW/m$^3$) |
| --- | --- | --- | --- | --- | --- | --- | --- | --- | --- | --- |
| Example 17 | 50–52 | 5 | 1.3 | 0.01 | 1.16 | 3.0–3.5 | 0.48 | 163 | 13 | 10 |
| Example 18 | 65–69 | 15 | 1.6 | 0.04 | 1.25 | 4.5 | 0.25 | 168 | 13 | 15 |
| Example 19 | 55–58 | 7 | 1.2 | 0.01 | 1.25 | 4.0 | 0.40 | 156 | 13 | 10 |
| Comparative Example 2 | 79–84 | 655 | 2.0 | 0.24 | 0.91 | 9.5–10.0 | 0.18 | 95 | 1.3 | 10 |
| Comparative Example 3 | 72–84 | 500 | 1.7 | 0.20 | 1.22 | 9.5–10.0 | 0.15 | 98 | 13 | 8 |
| Comparative Example 4 | 80–85 | 650 | 3.6 | 0.18 | 1.18 | 6.4–6.0 | 0.13 | 100 | — | — |
| Comparative Example 5 | 80–85 | 610*[1] | — | 0.22 | 1.16 | 11.5–10.5 | 0.19 | 107 | 13 | 8 |
| Comparative Example 6 | | | | | 1.17 | | | | 30 | 4 |

*[1]Residual K (ppm)

What is claimed is:

1. A process for producing polycyanoaryl ether powder, which comprises reacting in a reactor a reaction mixture comprising a dihalogenobenzonitrile, a dihydric phenol and an alkali metal salt in the presence of a polymerization solvent at a temperature of 140° to 350° C. for 1 to 10 hours under a pressure of atmospheric pressure to 2300 mmHg, and distilling said solvent away from the reaction mixture, while pulverizing under agitation at a maximum powder of 3 to 40 KW per m$^3$ of the reaction mixture and at a clearance of not more than 13 mm between a wall of the reactor and a reactor blade or between reactor blades, a molar ratio of the dihalogenobenzonitrile to the dihydric phenol being 0.95–1.20 to 1, said dihydric phenol being at least one dihydric phenol selected from the group consisting of dihydroxybenzenes, dihydroxybiphenyls, dihydroxynaphthalenes and dihydroxybiphenyl ether, said alkali metal salt being at least one salt selected from the group consisting of sodium hydrogen carbonate, sodium carbonate, potassium carbonate and potassium hydrocarbonate, said polymerization solvent being at least one solvent selected from the group consisting of N-alkylcarboxylic acid amides, N,N-dialkylcarboxylic acid amides, N-alkyl lactams, N-alkylcarboxyimides, sulfoxides, sulfones, cyclosulfones, nitriles and benzophenone, and said distilling away of said solvent being carried out such that 0.007 to 0.7 times as much solvent as an amount of solvent to be used for the reaction is distilled away per minute.

2. The process according to claim 1, wherein said reaction mixture is cooled while pulverizing under said agitation, and subsequently said solvent is distilled away.

3. The process according to claim 2, wherein said agitation is carried out by agitating in an agitation tank provided with agitating blades.

4. A process for producing polycyanoaryl ether powder, which comprises:
   (i) reacting in a reaction mixture a dihalogenobenzonitrile, a dihydric phenol and an alkali metal salt in the presence of a polymerization solvent at a temperature of 140° to 350° C. for 1 to 10 hours under a pressure of atmospheric pressure to 2300 mmHg, a molar ratio of the dihalogenobenzonitrile to the dihydric phenol being 0.95–1.20 to 1, said dihydric phenol being at least one dihydric phenol selected from the group consisting of dihydroxybenzenes, dihydroxybiphenyls, dihydroxynaphthalenes and dihydroxybiphenyl ether, said alkali metal salt being at least one salt selected from the group consisting of sodium hydrogen carbonate, sodium carbonate, potassium carbonate and potassium hydrocarbonate, and said polymerization solvent being at least one solvent selected from the group consisting of N-alkylcarboxylic acid amides, N,N-dialkylcarboxylic acid amides, N-alkyl lactams, N-alkylcarboxyimides, sulfoxides, sulfones, cyclosulfones, nitriles and benzophenone, to form a polymer;
   (ii) adding a pulverization solvent to the reaction mixture for pulverizing the resultant polymer from step (i), or adding said polymerization solvent to the reaction mixture followed by mixing it, with a subsequent cooling, for pulverizing the resultant polymer from step (i), said pulverization solvent being compatible with said polymerization solvent, but not dissolving the resultant polymer; and
   (iii) subsequently distilling the solvent away, said solvent being distilled away for 0 to 480 minutes under an agitating powder of 3 to 40 KW per m$^3$ of the reaction mixture.

5. The process according to claim 4, wherein the reaction mixture is diluted by adding said polymerization solvent in such an amount that the resultant polymer may not be pulverized, and said pulverization solvent is added thereto to pulverize the resultant polymer.

6. A process for producing polycyanoaryl ether powder, which comprises:
   (a) reacting in a reaction mixture a dihalogenobenzonitrile, a dihydric phenol and an alkali metal salt in the presence of a polymerization solvent at a temperature of 140° to 350° C. for 1 to 10 hours under a pressure of atmospheric pressure to 2300 mmHg, a molar ratio of the dihalogenobenzonitrile to the dihydric phenol being 0.95–1.20 to 1, said dihydric phenol being at least one dihydric phenol selected from the group consisting of dihydroxybenzenes, dihydroxybiphenyls, dihydroxynaphthalenes and dihydroxybiphenyl ether, said alkali metal salt being at least one salt selected from the group consisting of sodium hydrogencarbonate, sodium carbonate, potassium carbonate and potassium hydrocarbonate;
   (b) cooling the reaction mixture obtained from step (a) to deposit a polymer;
   (c) then pulverizing the resulting polymer from step (b) without or with a pulverization solvent or a polymerization solvent, followed by mixing, said pulverization solvent having a compatibility with said polymerization solvent, but not dissolving the resultant polymer, said polymerization solvent being at least one solvent selected from the group consisting of N-alkylcarboxylic acid amides, N,N-dialkylcarboxylic acid amides, N-alkyl lactams, N-alkylcarboxyimides, sulfoxides, sulfones, cyclosulfones, nitriles and benzophenone; and
   (d) subsequently distilling the solvent away for 0 to 480 minutes.

7. The process according to claim 6, wherein the pulverizing is carried out under agitation at a maximum powder of 3 to 40 KW per m³ of the reaction mixture and at a clearance of not more than 30 mm between a reactor wall and a reactor blade or between reactor blades.

8. The process according to claim 7, wherein said agitation is applied by agitating in an agitation tank provided with agitating blades.

9. The process according to any one of claims 1, 4 and 6, wherein said dihalogenobenzonitrile is at least one dihalogenobenzonitrile selected from the group consisting of 2,6-dichlorobenzonitrile, 2,6-difluorobenzonitrile, 2,4-dichlorobenzonitrile, 2,4-difluorobenzonitrile, 2-chloro-6-fluorobenzonitrile, and 2-fluoro-6-chlorobenzonitrile.

10. The process according to any one of claims 1, 4 and 6, wherein said dihydroxybenzene is 1,3-dihydroxybenzene or 1,4-dihydroxybenzene.

11. The process according to any one of claims 1, 4 and 6, wherein said polymerization solvent is dimethyl sulfoxide, dimethyl sulfone, diethyl sulfone, diphenyl sulfone, sulfolane, N,N-dimethyl formamide, N-methyl pyrrolidone, N-methyl pyrrolidinone, or the mixtures thereof.

12. The process according to claim 4 or 6, wherein said pulverization solvent is methanol, ethanol, propanol, isopropanol, acetone, methyl ethyl ketone, water or mixtures thereof.

13. The process according to any one of claims 1, 4 and 6, which further comprises carrying out a neutralization treatment with an organic acid after the solvent is distilled away.

14. The process according to any one of claims 4 and 6, wherein said pulverization solvent is a mixture of said polymerization solvent and at least one solvent selected from the group consisting of methanol, ethanol, propanol, isopropanol, acetone, methyl ethyl ketone and water.

15. The process according to claim 1, wherein the dihalogenobenzonitrile is selected from the group consisting of 2,6-dichlorobenzonitrile, 2,6-difluorobenzonitrile, 2,4-dichlorobenzonitrile, 2,4-difluorobenzonitrile, 2-chloro-6-fluorobenzonitrile, 2-fluoro-6-chlorobenzonitrile; the dihydricphenol is selected from the group consisting of 1,2-dihydroxybenzene, 1,3-dihydroxybenzene, 1,4-dihydroxybenzene, 2-methyl-1,4-dihydroxybenzene, 2,6-dimethyl-1,4-dihydroxybenzene, 2-methoxy-1,4-dihydroxybenzene, 4,4'-dihydroxybiphenyl, 3,5'-dihydroxybiphenyl, 3,5-dihydroxybiphenyl, 3-methyl-4,4'-dihydroxybiphenyl, 2,2'-dimethyl-4,4'-dihydroxyphenyl, 1,2-dihydroxynaphthalene, 1,3-dihydroxynaphthalene, 1,4-dihydroxynaphthalene, 1,5-dihydroxynaphthalene, 1,6-dihydroxynaphthalene, 1,7-dihydroxynaphthalene, 1,8-dihydroxynaphthalene, 2,3-dihydroxynaphthalene, 2,6-dihydroxynaphthalene, 2,7-dihydroxynaphthalene, 4,8-dimethyl-2,6-dihydroxynaphtahlene and 4,4'-dihydroxydiphenylether; the molar ratio of the alkali metal to the dihalogenobenzonitrole is 1.0–3.0 to 1; the solvent is selected from the group consisting of N-methylformamide, ethylacetoamide, N,N-dimethylformamide, N,N-diethylformamide, N,N-dimethylacetoamide, N-ethylpyrrolidone, N-methylpyrrolidone, dimethylsulfoxide, diethylsulfoxide, dimethylsulfone, diethylsulfone, diphenylsulfone, sulfolane, acetontrile, propionic nitrile, butylnitrile, succinonitrile, benzonitrile and benzophenone; the polymerization is carried out at a temperature of 160° to 250° C. for 1 to 10 hours; and the solvent distilled away is 0.3 to 0.7 times as much solvent as the solvent used in the reaction.

16. The process according to claim 15, wherein the dihalogenobenzonitrile is selected from the group consisting of 2,6-dichlorobenzonitrile and 2,6-difluorobenzonitrile and the dihydric phenol is selected from the group consisting of resorcinol and hydroquinone; the alkali metal salt is selected from the group consisting of sodium hydrocarbonate, sodium carbonate and potassium carbonate; and the solvent is selected from the group consisting of sulfolane, N-methylpyrrolidone and N-methyl-2-pyrrolidone.

17. The process according to claim 4, wherein the dihalogenobenzonitrile is selected from the group consisting of 2,6-dichlorobenzonitrile, 2,6-difluorobenzonitrile, 2,4-dichlorobenzonitrile, 2,4-difluorobenzonitrile, 2-chloro-6-fluorobenzonitrile, 2-fluoro-6-chlorobenznotrile; the dihydric phenol is selected from the group consisting of 1,2-dihydroxybenzene, 1,3-dihydroxybenzene, 1,4-dihydroxybenzene, 2-methyl-1,4-dihydroxybenzene, 2,6-methyl-1,4-dihydroxybenzene, 2-methoxy-1,4-dihydroxybenzene, 4,4'-dihydroxybiphenyl, 3,5'-dihydroxybiphenyl, 3,5-dihydroxybiphenyl, 3-methyl-4,4'-dihydroxybiphnyl, 2,2'-dimethyl-4,4'-dihydroxyphenyl; 1,2-dihydroxynaphtahlene, 1,3-dihydroxynaphthalene, 1,4-dihydroxynaphthalene, 1,5-dihydroxynaphthalene, 1,6-dihydroxynaphthalene, 1,7-dihydroxynaphthalene, 1,8-dihydroxynaphthalene, 2,3-dihydroxynaphthalene, 2,6-dihydroxynaphthalene, 2,7-dihydroxynaphthalene, 4,8-dimethyl-2,6-dihydroxynaphthalene and 4,4'-dihydroxydiphenylether; the molar ratio of the alkali metal to the dihalogenobenzonitrile is 1.0–3.0 to 1; the polymerization solvent is selected from the group consisting of N-methylformamide, ethylacetoamide, N,N-dimethylformamide, N,N-diethylformamide, N,N-dimethylacetoamide, N-methylpyrrolidone, N-ethylpyrrolidone, dimethylsulfoxide, diethylsulfoxide, dimethylsulfone, diethylsulfone, diphenylsulfone, sulfolane, acetonitrile, propionic nitrile, butylnitrile, succinonitrile, benzonitrile and benzophenone; and the polymerization is carried out at a temperature of 160° to 250° C.; the pulverization solvent is selected from the group consisting of methanol, ethanol, propanol, isopropanol, acetone, emthylethyl ketone, water and a mixture of N-methyl pyrrolidone and water; the pulverization solvent being in an amount of 0.5 to 5.0 times as much as the polymer solution; the cooling being carried out at a temperature of room temperature to 130° C. for 1 to 480 minutes.

18. The process according to claim 17, wherein the dihalogenobenzonitrile is selected from the group consisting of 2,6-dichlorobenzonitrile and 2,6-difluorobenzonitrile; the dihydric phenol is selected from the group consisting of resorcinol and hydroquinone; the alkali metal salt is selected from the group consisting of sodium hydrocarbonate, sodium carbonate and potassium carbonate; and the polymerization solvent is selected from the group consisting of sulfolane, N-methyl pyrrolidone and N-methyl-2-pyrrolidone.

19. The process according to claim 7, wherein the dihalogenobenzonitrile is selected from the group consisting of 2,6-dichlorobenzonitrile, 2,6-difluorobenzonitrile, 2,4-dichlorobenzonitrile, 2,4-difluorobenzonitrile, 2-chloro-6-fluorobenzonitrile, 2-fluoro-6-chlorobenznotrile; the dihydric phenol is selected from the group consisting of 1,2-dihydroxybenzene, 1,3-dihydroxybenzene, 1,4-dihydroxybenzene, 2-methyl-1,4-dihydroxybenzene, 2,6-methyl-1,4-dihydroxybenzene, 2-methoxy-1,4-dihydroxybenzene, 4,4'-dihydroxybiphenyl, 3,5'-dihydroxybiphenyl, 3,5-dihydroxybiphenyl, 3-methyl-4,4'-dihydroxybiphnyl, 2,2'-dimethyl-4,4'-dihydroxyphenyl; 1,2-dihydroxynaphtahlene, 1,3-dihydroxynaphthalene, 1,4-dihydroxynaphthalene, 1,5-dihydroxynaphthalene, 1,6-dihydroxynaphthalene, 1,7-dihydroxynaphthalene, 1,8-dihydroxynaphthalene, 2,3-dihydroxynaphthalene, 2,6-dihydroxynaphthalene, 2,7-dihydroxynaphthalene, 4,8-dimethyl-2,6-dihydroxynaphthalene and 4,4'-dihydroxydiphenylether; the molar ratio of the alkali metal to the dihalogenobenzonitrile is 1.0–3.0 to 1; the polymerization solvent is selected from the group consisting of N-methylformamide, ethylacetoamide, N,N-dimethylformamide, N,N-diethylformamide, N,N-dimethylacetoamide, N-methylpyrrolidone, N-ethylpyrrolidone, dimethylsulfoxide, diethylsulfoxide, dimethylsulfone, diethylsulfone, diphenylsulfone, sulfolane, acetonitrile, propionic nitrile, butylnitrile, succinonitrile, benzonitrile and benzophenone; the polymerization is carried out at a temperature of 160° to 250° C. and the cooling being carried out at a temperature of room temperature to 130° C. for 1 to 480 minutes.

20. The process according to claim 19, wherein the dihalogenobenzonitrile is selected from the group consisting of 2,6-dichlorobenzonitrile, and 2,6-difluorobenzonitrile; dihydric phenol is selected from the group consisting of resorcinol and hydroquinone; the alkali metal salt is selected from the group consisting of sodium hydrocarbonate, sodium carbonate and potassium carbonate; and the solvent is selected from the group consisting of sulfolane, N-methyl pyrrolidone and N-methyl-2-pyrrolidone.

* * * * *